United States Patent [19]
Terry

[11] 3,800,834
[45] Apr. 2, 1974

[54] JACKET FOR CYLINDRICAL ARTICLES

[75] Inventor: Rupert Douglas Terry, Toledo, Ohio

[73] Assignee: Johns-Manville Corporation, New York, N.Y.

[22] Filed: Mar. 6, 1972

[21] Appl. No.: 232,308

Related U.S. Application Data

[62] Division of Ser. No. 845,404, July 28, 1969, Pat. No. 3,660,890.

[52] U.S. Cl. ............................................. 138/151
[51] Int. Cl. ........................................... F16l 53/00
[58] Field of Search .......... 138/114, 128, 143, 149, 138/151, 170, 171, DIG. 2, DIG. 4

[56] References Cited
UNITED STATES PATENTS

| | | | |
|---|---|---|---|
| 3,058,861 | 10/1962 | Rutter | 138/149 |
| 2,790,464 | 4/1957 | Stephens et al. | 138/151 |
| 2,949,953 | 8/1960 | DiMaio et al. | 138/152 |
| 3,187,778 | 6/1965 | Peyton et al. | 138/143 |
| 3,615,149 | 10/1971 | Malone et al. | 138/143 |
| 3,473,575 | 10/1969 | Vogelsang et al. | 138/114 |
| 3,183,300 | 5/1965 | Jachimowicz et al. | 138/171 |
| 2,629,806 | 2/1953 | Anderson | 138/171 |

FOREIGN PATENTS OR APPLICATIONS

| | | | |
|---|---|---|---|
| 650,666 | 12/1962 | Italy | 138/149 |

Primary Examiner—Herbert Goldstein

[57] ABSTRACT

A duct of thermal insulation is jacketed with a gas impermeable sheet material with a longitudinal seam formed by turning the mating ends of the sheet material outwardly and thermally fusing those ends into a linear nodular bead. In the case of metal foils of a few thousandths of an inch in thickness the bead is of the order of a thirty-second of an inch and is turned into the foil jacket to present a smooth non-cutting surface.

Semi-butt welds of foil are made by clamping the foil in face to face relationship along an essentially line contact and moving an arc welding electrode with associated gas jets for a non-oxidizing gas parallel to and in close spaced relation to the clamp line. Jacketing for preformed ducts of glass or other fiber type insulation is drawn from a supply of sheet stock to form a caternary loop in which a preformed duct is placed. Jaws forming unitary clamps and welding electrodes are closed to close the opposite sides of the loop of foil around the duct and upon each other. The foil is severed closely adjacent the clamps and the electrode with its jets for the gas is moved along the exposed edges of foil adjacent the electrode clamps while drawing an arc to fuse the opposed foil surfaces together. The clamps are then released, the jacketed duct removed from the welding apparatus and the radially extending, fused foil bead pressed parallel to the outer face of the duct.

1 Claim, 9 Drawing Figures

PATENTED APR 2 1974 3,800,834

JACKET FOR CYLINDRICAL ARTICLES

This is a division of application Ser. No. 845,404, filed July 28, 1969, now U.S. Pat. No. 3,660,890.

BACKGROUND OF THE INVENTION

This invention relates to jackets for cylindrical articles and to methods and apparatus for encompassing articles with jacketing material and joining the jacketing material.

More particularly, it relates to closing a sheet of foil upon itself while encompassing a body to form a jacket therefor.

Heretofore great difficulty has been experienced in joining thin sheet metal by welds of the butt type even in materials such as ferrous sheet which are readily welded in thick bodies. The materials are difficult to maintain in weldable relationship, they are prone to distort under welding temperatures, they tend to puncture during welding due to excessive melting, oxidation is difficult to avoid, and in some instances, a tendency to adhere to the electrodes or clamps is experienced.

One form of the present invention is an aluminum foil jacketed duct of glass fiber mat having a longitudinal fusion weld to provide a gas impervious envelope. Heretofore, effort to jacket similar duct with aluminum has been made where the foil was overlapped and joined with a bonding agent such as a resin adhesive. Such bonds were less than satisfactory since the adhesive was applied to the non-porous foil and had no opportunity to penetrate and develop a keyed coupling with the foil. When bonded with cement, it had a low melt index, a lack of solvent escape, and an inability to pass certain fire and safety tests. More recently ultrasonic welds have been attempted. Such welds were made on circumferentially overlapped portions of foil by inserting an underlying anvil between the foil and the preformed, glass mat, tube. The labor cost for ultrasonic bonds were high, manipulation required for withdrawal of the anvil disfigured the jacket, the excess foil required in the overlap was wasteful. the resultant sharp edge was exposed and was a hazard, and the ultrasonic welding equipment was excessively expensive.

SUMMARY OF THE INVENTION

The present invention involves joining thin sheet material while encompassing a body such as air duct by clamping a sheet of the material which closely fits the body along a line in close proximity to the body, removing all but a limited band of material extending from each side of the jacket and protruding from the clamp body, and subjecting the exposed band to a bonding process.

An object of this invention is to improve the manufacture and form of foil jacketing.

Another object is to eliminate the need for tooling internal of a jacket of sheet material applied to a cylindrical article.

A third object is to avoid the formation of hazardous edges on the foil jacket of duct.

A feature of the jacket of this invention is the formation of a bond between mating outwardly turned edges of the sheet material of the jacket as a nodular bead. This bead presents no sharp edges and in the case of its development by thermal welding of aluminum foil, it is readily pressed against the surface of the jacket to form a smooth outer surface for the finished product.

Another feature is the method of forming a jacket of sheet material on a cylindrical article by fixing the material along a first straight edge with a portion of the surface engaging the article turned outward, carrying the sheet material around the body to meet the turned portion with another portion of that surface which is also turned outward, and forming a bond between the out turned ends of those meeting portions closely adjacent the cylindrical article.

Apparatus for jacketing a cylindrical article with sheet material includes as one feature a stationary bar having a tungsten rod along its edge and a series of clamps which can be brought to bear on a face of the bar to clamp one edge of a strip of foil thereon.

Another feature is a complementary movable bar having a tungsten rod edge as a second element cooperating with the first bar to form a jacket clamp. Foil is first draped as a catenary between the bars with their edges separated. The edges are then closed upon the interveening two layers of foil to draw the foil taut on the cylindrical article.

A further feature of the apparatus is an adjustable table or platform enabling the apparatus to accommodate bodies of various sizes and maintaining the body in proper relationship to the jacket clamps so that upon closing the clamps the supply end of the jacket material is drawn taut upon the body.

A sixth feature of the apparatus is a carriage or trolley which carries a foil severing means and the welding electrodes and gas jets along the region adjacent the jacket clamps.

Another feature is the essentially butt type weld achieved with thin foils without tooling internal of the resulting jacket whereby the removal of the jacketed element from the apparatus is facilitated, disfiguration of the jacket by distortion is minimized, and the trimming of the completed joint is eliminated.

DESCRIPTION OF THE PREFERRED EMBODIMENTS

Figure 1:
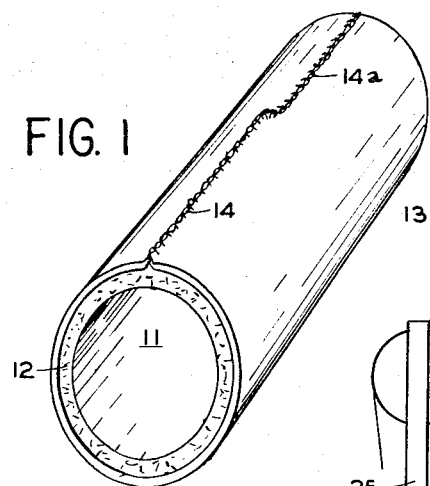
FIG. 1 is a perspective of a section of jacketed air duct having a welded seam exaggerated in size to illustrate the radially protruding weld bead and its form as turned parallel to the jacket according to this invention.

A circular air duct 11 made up of a tube of matted glass fibers 12 and having an aluminum foil jacket 13 is shown in FIG. 1. The glass fiber structure 12 can be made by the conventional gas attenuating processes and combined in mat form with a resinous or other adhesive bonding agent to bond the fibers into a durable, resilient, self-retaining mat. The bonded mat is wound upon a mandrel and subjected to heat and pressure to impart the final duct shape to the fibrous mass. Although glass fibers are preferred due to their ease of formation and low cost, other common materials which can be fiberized can be employed exclusively or in part in the formation of the mat. These may include known products manufactured from various source materials of silicates of metal oxides, such as rock wools, from argillaceous matter or shale, slag wool from metallurgical slags, each commonly referred to as "mineral wools," aluminum silicate fibers, and any fibers of the so-called glasses. The final duct shape can be other than a right circular cylinder, for example, it can be ellipitical or generally rectangular in cross section.

A gas impervious jacket of aluminum foil is formed around the self-sustaining tubular structure 12 by placing a sheet of aluminum foil around the structure, clamping the interior faces of opposite sides of the sheet together at a position closely adjacent the tubular structure 12, and welding those faces together. The foil edges, when of 0.003 inch thick aluminum and when clamped together with about one-eighth inch protruding beyond the clamping means fuses into a nodular bead 14 of less than one-sixteenth inch in height extending radially from the jacket 13 and by virtue of its ductility can be formed essentially parallel to the jacket, as shown at 14a in FIG. 1, by wiping across the bead with a pressure sufficient to turn the bead without distorting duct, as with a block of wood. The resultant joint between the ends of the foil has been termed a semi-butt weld in that it is a gas impervious joint of fused aluminum derived from the foil itself with no circumferential overlap other than that of the turned bead 14a. The overlap is of the order of a thirty second of an inch and offers an essentially smooth and continuous outer surface for the final product presenting no sharp edges which would be hazardous to those handling the duct.

Figure 2:
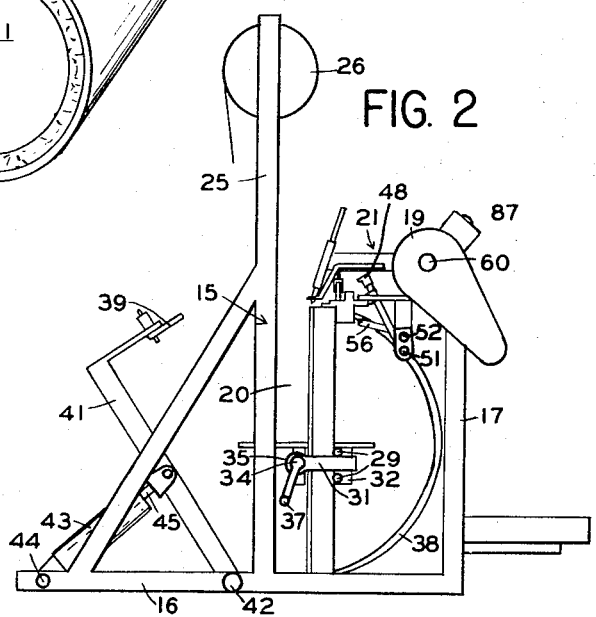
FIG. 2 is an end view of the apparatus for forming the jacket of FIG. 1 in accordance with the method of this invention with the apparatus as conditioned for initiation of the production of a jacketed duct.
Figure 3:
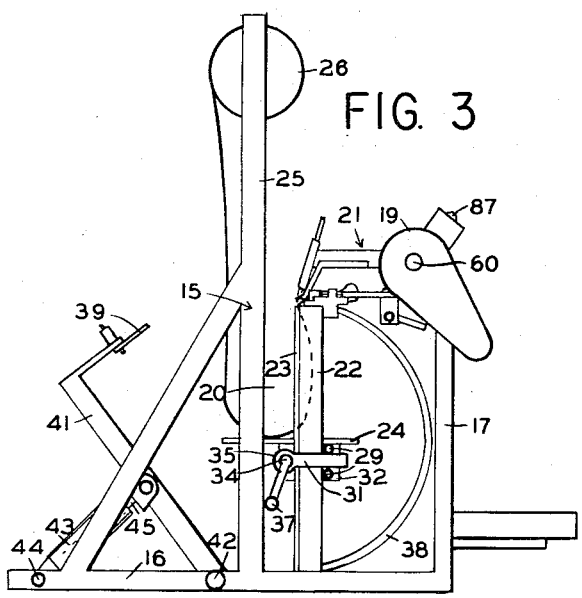
FIG. 3 is an end view as in FIG. 2 with the free end of the jacketing foil secured in the apparatus.
Figure 4:
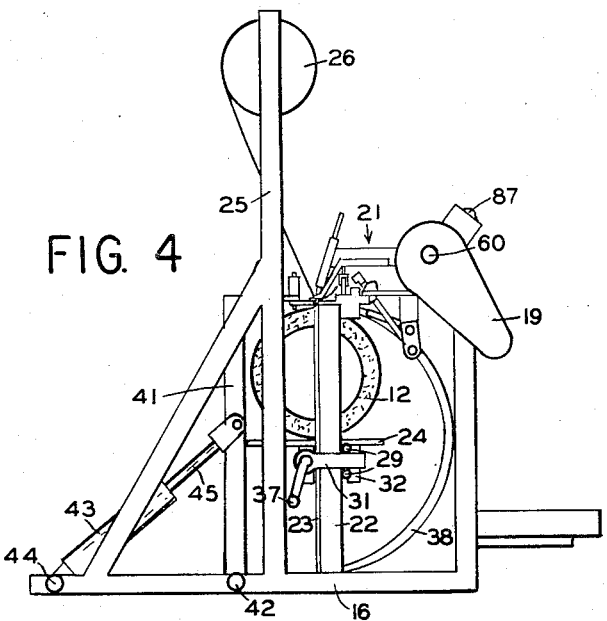
FIG. 4 is an end view as in FIG. 2 with the jacketing foil clamped around the duct underbody, the foil end clamp retracted and the apparatus conditioned for trimming the foil preparatory to welding the clamped ends.

Apparatus for applying the foil jacket is disclosed in its various stages of utilization in FIGS. 2 through 4. It comprises a frame 15 including a base 16. A set of stanchions 17 extend upward from the base 16 at its front for supporting a control panel 18, guards 19 and a trolley assembly 21. A pair of end stanchions 22 provide a rail and a base for rack 23 whereby a table 24 positioned within the frame can be adjusted in its elevation for supporting workpieces, as structure 12 in FIG. 4, for jacketing. A roll stand 25 extends upward from frame base 16 to support a coil 26 of foil for rotation.

A range of sizes of glass fiber mat structures 12 can be accommodated in the region 20 of the illustrated apparatus. In each jacketing process the upper face of the cylindrical article 12 is positioned in region 20 with its longitudinal axis horizontal so that it is immediately below the horizontal stationary jaw 27 of a unitary foil clamp and electrode structure 28 as shown in detail in FIGS. 5 through 7 in order to enable the foil jacket to be clamped closely adjacent the structure. Table 24 is adjustable in its height to enable the proper orientation of each of a range of sizes of mat structures 12. Each of stanchions 22 has opposed flanges, one of which supports rack 23 and the other of which provides a rail upon which rollers 29 ride. A table support car is formed by side bars 31 at each stanchion extending to an end panel 32 upon which rollers 29 are journaled and from which a transverse rod (not shown) extends to the opposite end panel. Drive shaft 34 is journaled in a boss 35 on the end of each side bar opposite its end panel and has a pinion (not shown) engaged with rack 23, a suitable means of rotation such as hand crank 37 and suitable means to maintain the adjusted position such as a brake (not shown) on shaft 34.

Circular mat structures 12 are confined within region 20 by the semicircular guides 38 in frame 15 to tend to center the structures with respect to the clamp and electrode 28.

A movable clamp and electrode jaw 39 is mounted on a series of L-shaped arms 41 pivoted on shaft 42 secured in base 16. This jaw is moved in an arc around shaft 42 by means of pneumatic cylinders 43 having their blind ends pivoted at 44 to base 16 and their piston rods 45 pivotally connected to arms 41. Controls for the positioning of jaw 39 are provided on control panel 18 so that it can either be retracted from jaw 27 as shown in FIG. 2, or brought into clamping relationship with jaw 27 as shown in FIG. 4.

The initial step in forming a jacket is to draw foil from coil 26, and clamp its free end across its width against the upper face of bar 27 forming the stationary jaw. The foil forms a catenary between the coil and the jaw 27. The free end of the foil strip is clamped by clamping feet 48 each of which is carried on a lever 49 pivotally connected by a crank 51 on control rod 52 and guided between rollers 53 carried by a guide bail 54 secured to a support beam 55. A control lever 56 is secured to control rod 52 so that its movement from the position shown in FIGS. 2 and 5 to that shown in FIG. 6 and finally to that shown in FIGS. 3 and 7 causes the feet 48 to be extended to a position adjacent the free edge of jaw 27 and to be brought into engagement with the upper face of the jaw to clamp the end of the foil.

Tubular mat structure 12 is placed in the catenary formed by the foil with table 24 adjusted to a height below jaw 27 slightly greater than the outer diameter of the structure in the case of a circular duct. Jaw 39 is then moved to clamping relationship with jaw 27 to center the mat structure 12 below the closed jaws 27 and 39, draw the foil taut over the mat structure 12 and clamp the inner faces of the mating foil portions together. The apparatus is thus conditioned as shown in FIG. 4.

The sheet material of the jacket 13 is in this manner carried around the preformed duct 12 and turned outwardly therefrom where the opposite sides meet. The face of the material which engages the duct in the region turned outwardly on each of the mating sides are maintained in abutting relation. These regions are carried over edges having smooth, convex curved, cross sections along straight lines so that the seam at the mating edge when trimmed close to the clamping elements appears as a double thickness of the jacket material extending generally radially with the two layers having a slight tendency to diverge from each other.

The clamped foil is severed from the supply and from the clamped free end along a line closely adjacent and paralleling the unitary clamp and electrode jaws 27 and 39. One means of accurately cutting the foil is by means of a blade 57 mounted on a carriage 21 which also carries a welding assembly 58. The carriage is guided along a path paralleling the clamping jaws 27 and 39 by means of a pair of rails 59 in the form of circular rod and a drive screw 60. Sliding bearings 59a couple the carriage to rods 59 and a split nut (not shown) provides driving engagement between the carriage and drive screw 60. The screw 60 and nut can be arranged for bidirectional drive or can be arranged to be released so that the carriage can be manually moved from one end of the track to the other sever the foil and can be driven at a controlled rate of advance in the opposite direction for welding the protruding foil ends.

Figure 8:
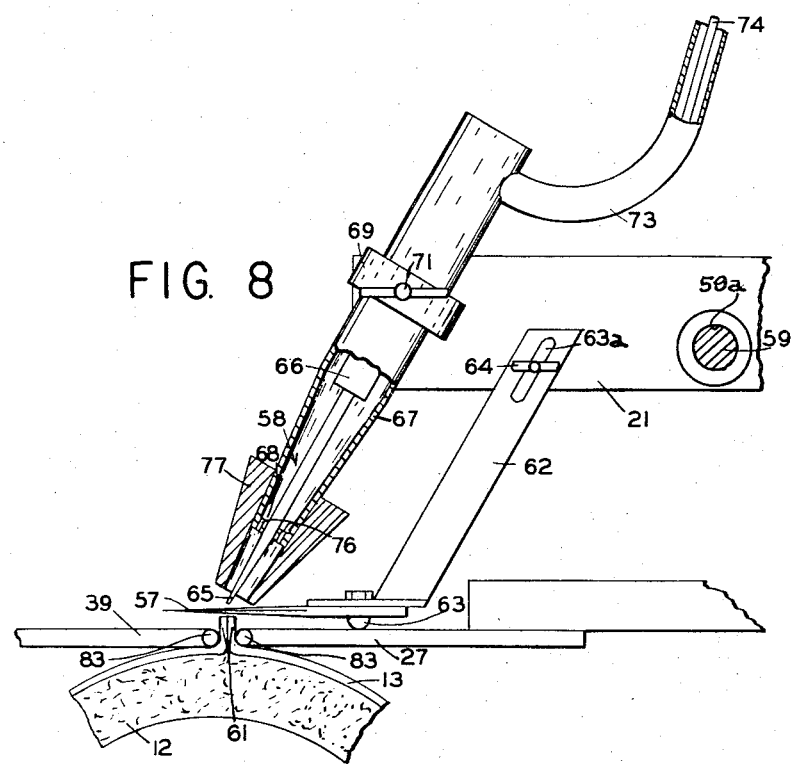
FIG. 8 is an enlarged end view of the foil trimming blade, and the composite welding electrode and gas supply manifold.
Figure 5:
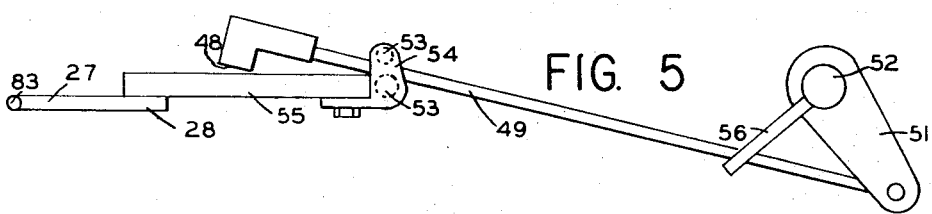
FIGS. 5 through 7 are detailed views of a foil end clamp in its various positions of retraction, advance and clamping condition.
Figure 6:
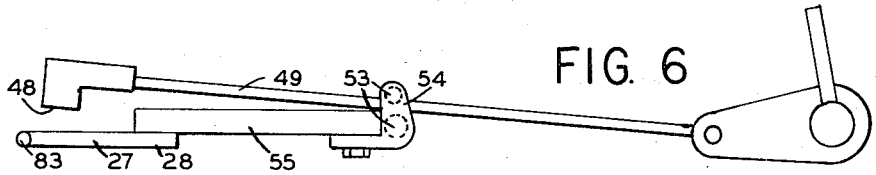
Figure 7:
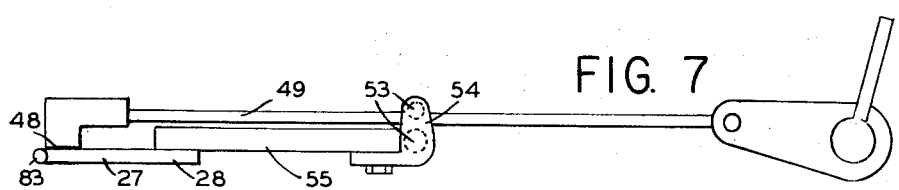

In initially securing the free end of the foil, a short length, about an inch, of material is positioned upon the upper face of jaw 27, control lever 56 (FIGS. 5 to 7) is rotated clockwise as viewed in FIGS. 2 to 7 so that rod 52 carries cranks 51 in a clockwise direction to clamp feet 48 on the foil end. After the jaw 39 is engaged with jaw 27, the clamping action of feet 48 is no longer required and the region adjacent the closed jaws is cleared by retraction of the feet 48. Lever 56 is rotated counter-clockwise to raise feet 48 and retract them as shown in FIGS. 4 and 5. The blade 57 is arranged as shown in FIG. 8 to be located within about a sixteenth of an inch of the jaws 27 and 29 and is moved along those jaws without interference with the retracted feet 48. The free end of the foil and that portion extending to the foil source, coil 26, are each severed from the clamped jacketing foil 13 to present about a sixteenth of an inch of a double thickness of the foil protruding radially from the duct.

FIG. 8 is an enlarged side view of a portion of the fiber tube 12, the foil jacket 13 and its clamped ends 61. Blade 57 is maintained generally parallel to jaw 27 by its holder rod 62 to which it is secured as by machine screws 63. The carriage 21 supports holder rod 62 so that it can be adjusted as by means of the slot 63a and thumb screw 64. The angular position of the cutting edge of the blade with respect to foil ends 61 can also be adjustable where that relationship is significant in effectively shearing the foil.

Figure 9:
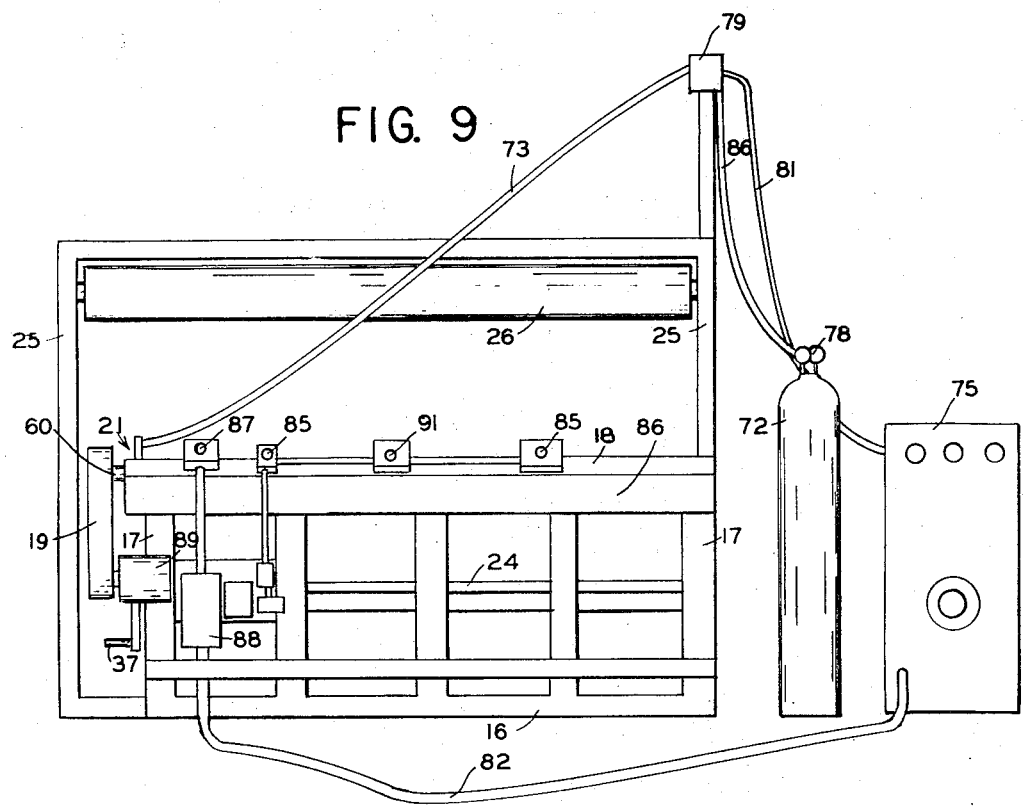
FIG. 9 is a front view of the apparatus of FIGS. 2, 3 and 4.

Welding head 58 is supported on carriage for adjustment with respect thereto. Ordinarily, it is oriented so that its electrode tip 65 is centered above the two ends 61 with a spacing therefrom of about one sixteenth to one quarter of an inch with one eighth inch being preferred. Tip 65 is mounted in a holder 66 and maintained coaxial with a gas manifold 67 by the end closure 68 at the lower end of the manifold and suitable spider supports (not shown) to the holder. Adjustment of the electrode and manifold position relative to carriage 21 is provided by the coupling therebetween as by a collar 69 which can be mounted for rotation and reciprocation as by a machine screw in a slot on the carriage (not shown) and has a clamping screw 71 to secure the manifold 67. Helium is supplied to the manifold from tank 72 (FIG. 9) through flexible tubing 73 which also encloses the conductor 74 to electrode holder 66 and electrode 65.

Welding of the foil ends is by a conventional inert gas-arc process wherein electrode 65 is suitably supplied with electrical energy from a commercial welding control 75. The electrode encompassing gas manifold 67 has an array of apertures 76 from which jets are directed toward the welding tip. A refractory skirt 77 confines the gas issuing from the manifold 67 to the region of the arc to form an inert envelope of gas around the fused aluminum and the electrode. The electrode 65 is insulated from the remainder of the apparatus and from the gas supply 72 and gas controls 78. It is connected to the welding controller 75 by conductor 74 through junction box 79 and conductor 81. The controller 72 is also connected to the frame 15 of the welding apparatus maintained at ground potential by a grounding conductor in cable 82.

The cooperating welding electrodes are tungsten rods 83, as best seen in FIGS. 5 through 8, secured to the clamping edges of clamping jaws 27 and 39 as by silver solder to afford good heat conductivity from the weld to the heat sink provided by the blades and their supporting structure. Tungsten clamp rods have the further advantage that they eliminate any tendency to adhere to the aluminum foil. This release characteristic is important where all pin holes are to be avoided in the seam 14 as in the case of air duct jacketing.

In practice, the jacket has been formed of aluminum foil of 0.002 inch and 0.003 inch thickness using circular tungsten rod of 0.040 inch diameter as the clamping edges and electrodes 27 and 39. These edges are closed upon the intervening foil by the operator manually actuating both control knobs 85 of FIG. 9. With the jaws 27 and 39 closed, the carriage drive nut is opened and the carriage 21 is slid from the right end to the left end of its travel as viewed in FIG. 9. Guard 86 obscures the carriage, its drive and guide mechanism in FIG. 9. This motion of carriage 21 causes blade 57 to trim the foil seam to the form of the radially protruding ends 61 of FIG. 8. A weld is made by fusing the protruding ends 61 by striking an arc between electrode tip 65 and the ends and causing carriage to advance along the seam from the left end to the right end as viewed in FIG. 9.

A nodular bead is formed by melting the ends 61. No filler material is required since the protruding ends provide sufficient material for the weld. An inert atmosphere such as argon or helium is maintained around electrode 65 and the molten aluminum during the weld by setting the gas flow controls 78 to pass about 5 cubic feet per hour from tank 72 through tubing 86 to control box 79 where the conductor 74 is introduced into the tube 73 which conveys the gas from tube 86 to manifold 67.

In welding aluminum foil, the arc is struck by superimposing a high frequency signal on the regular sixty cycle alternating welding current. The arc is instituted by the operator by manually operating switch 87 which is effective through control box 88 and cable 82 to welder 75 to actuate the welding control. The superimposed high frequency is sustained in the case of aluminum foil in order to insure the continuity of the arc throughout the travel of the electrode 65 along the edge of the seam formed by the foil edges 61.

Energy to the weld is a direct function of the mass of the material to be melted and an inverse function of the speed of travel of the electrode. In the present instance, the carriage was set to traverse a six foot travel in 0.45 minute in order to maintain the desired precision of the spatial relationship of the electrode with the seam to be welded. That relationship is with the welding tip center in a zone defined by an extension upward of the outer faces of the foil edges, i.e., 0.006 inch plus any divergence of the foils, with the electrode centered between those limits for the optimum relationship. The vertical separation of from 1/16 inch to 1/4 inch with 1/8 inch, the optimum between the upper edge of the foil and the electrode is utilized. In the apparatus employed it is believed the uniformity of the weld deteriorated as the speed was increased above about 0.22 ft. per second due to vibration of the carriage. Therefore, it is anticipated that speed can be increased as the apparatus is refined.

Motor 89 drives screw 60 through a clutch and suitable linkage (not shown) within housing 19. The clutch is engaged at the time the welding arc is struck in response to actuation of switch 87. Termination of the arc and release of the clutch is controlled by a limit switch (not shown) which is responsive to the travel of carriage 21 to its limit on the right side of FIG. 9. Motor speed can be adjusted by means of any suitable motor speed control (not shown) to adjust the speed of advance of the carriage 21.

Welding current of from 35 to 40 amperes is drawn at a voltage of 15 to 20 volts with the parameters noted above. At slower speeds of carriage advance the current is reduced and at higher speeds it is increased.

Upon completion of the traverse of carriage 21 to form the weld bead 14 along the entire length of the jacket 13, the control switch 91 is manually operated by the operator to retract jaw 39. The jacketed duct is removed from the region 20 to clear the apparatus for another jacketing operation.

The present invention has been applied to aluminum foil of thickness of 2 mills and greater employing a helium shielding envelope to jacket fiber glass air duct. However, it is to be appreciated that certain aspects of the method and apparatus can be applied to other jacketing materials and that other metallic foils can be applied as jackets according to the disclosure. Further, cylindrical articles other than the disclosed air duct can be jacketed according to this invention. Variations in the apparatus as in the foil clamps 48, the carriage 21, the trimmer 57 and the bonding means of electrode 65 can be made. The method of applying the jacket to a cylindrical article can be accomplished by other than the apparatus illustrated and even by hand. For example, the edges of the sheet material can be secured to manually manipulate complementary elements to close the jacket material upon itself and around the article to be jacketed and the bonding of the closed edges accomplished by other means than the welding electrode shown. Thus the disclosure is to be read as illustrative of the invention and not in a limiting sense.

I claim:

1. A duct comprising a self-sustaining tube of fibrous mat thermal insulation having an inner wall defining the interior of said duct, a jacket of metallic foil stretched tautly around said tube and a continuous, gas impermeable joint between edges of said foil extending along the length of said tube comprising a thermally fused nodular bead of the metal of said foil protruding about one thirty-second of an inch from said tube along said foil edges with said bead being turned over against the surface of said tube so that the surface of said tube is smooth.

* * * * *